(12) United States Patent
Smith

(10) Patent No.: US 6,891,536 B2
(45) Date of Patent: May 10, 2005

(54) METHOD OF DETERMINING ACTIVE PRIORITIES

(75) Inventor: David Christopher Smith, Quakers Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 10/305,971

(22) Filed: Nov. 29, 2002

(65) Prior Publication Data

US 2003/0128224 A1 Jul. 10, 2003

(30) Foreign Application Priority Data

Nov. 30, 2001 (AU) .............................. PR9245

(51) Int. Cl.[7] .......................... G06T 15/40; G09G 5/00
(52) U.S. Cl. .................................... 345/421; 345/637
(58) Field of Search ......................... 345/619, 421, 345/422, 441, 637, 690

(56) References Cited

U.S. PATENT DOCUMENTS 4,885,703 A * 12/1989 Deering ..................... 345/422
5,592,601 A * 1/1997 Kelley et al. ............... 345/443
2002/0175925 A1 * 11/2002 Lie ............................ 345/690

* cited by examiner

Primary Examiner—Kee M. Tung
Assistant Examiner—Aaron M. Richer
(74) Attorney, Agent, or Firm—Fitzpatrick, Cella, Harper & Scinto

(57) ABSTRACT

A method (300) and apparatus (1000) for determining active objects contributing to a run of pixels corresponding to a scanline is disclosed. The method 300 utilizes two memory (1006) integer arrays (1101) and (1102) of size N, where N represents the number of objects in a job to be rendered. The first array (1101) is an active priority list and is preferably stored in memory (1006). The first array (1101) will be hereinafter referenced as the 'active priority list (i.e. L[ ])'. The second array (1102) is an array of pointers (i.e. indexes) that indicate vacant memory 1006 locations in the active priority list (1101), when an object is deactivated. The second array (1102) will be hereinafter referred to as a 'free list (F[ ])' and is also preferably stored in memory (1006). The active priority list (1101) and free list (1102) can be stored at consecutive memory (1006) addresses (e.g. Memory address 0 to memory address 2N) or alternatively, the active priority list (1101) and free list (1102) can be stored in any suitable free memory (1006) locations.

22 Claims, 12 Drawing Sheets

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| F | F | F | T | F | F | F | T | F | F | T | F | F | F | F | F | F | T | F | F |

Fig. 8

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| 3 | 2 | 1 | 0 | 7 | 6 | 5 | 4 | 3 | 2 | 1 | 0 | 7 | 6 | 5 | 4 | 3 | 2 | 1 | 0 |
| 0 | 0 | 0 | 1 | 0 | 0 | 0 | 1 | 0 | 0 | 1 | 0 | 0 | 0 | 0 | 0 | 0 | 1 | 0 | 0 |

Fig. 9

METHOD OF DETERMINING ACTIVE PRIORITIES

TECHNICAL FIELD OF THE INVENTION

The present invention relates generally to computer graphics and, in particular, to a method of determining which graphical objects are active at an edge-crossing for any given scan-line of a graphics rendering system. The invention also relates to a computer program product including a computer readable medium having recorded thereon a computer program for determining which graphical objects are active at an edge-crossing for any given scan-line of a graphics rendering system.

BACKGROUND ART

Software application programs, such as word processors, are generally configured to create page-based documents where each page contains document data such as graphical objects (e.g. text, images), represented by lines and fill regions. When representing the document data on a display device or a printing device, such software application programs generally use the graphics interface services of a host operating system to send commands describing graphical objects to the display or printing device. Such graphics interface services are referred to herein as a 'graphics device interface layer' and are generally configured as an application software programming interface which provides a rich set of graphics features to all applications executing on the host operating system.

One role of the graphics device interface layer is to mediate between an application program and an output device, such that the graphics device interface layer requires one or more device layers. One such device layer is referred to herein as a 'device driver', and is configured to support a relatively small set of functionality, such as drawing rectangular blocks of image data, and/or filling simple regions with flat color. The graphics device interface layer generally provides graphical objects to the device driver in a format that the graphics device interface layer considers is the most efficient for the device driver, and at the resolution of the output device. For example, a square of ten units by ten units positioned at the top left of a page of size twenty units by twenty units, may be rendered by a software application onto an A4 page (i.e. 210 mm by 297 mm) at 600 dpi, such that the graphical object is given to the device driver as a 'path' of five points (0,0), (2480,0), (2480,2480), (0, 2480), (0,0) where all of these points represent pixel values. The term path as used herein refers to a series of line segments, where each line segment consists of at least two points, such that each line segment traces the outline of a region (e.g. a graphical object) on a page.

Another device layer which is often referred to as a 'graphics rendering system', renders graphical objects received from the graphics device interface layer by generating pixel values. The term 'rendering' as used herein refers to the process by which graphical objects received from the graphics device interface layer are converted to pixels by the graphics rendering system.

In some computer systems, rendering is a two-stage process where graphical objects are firstly converted into an intermediate format before actual rendering can begin. In one such system, the first stage of the process is to convert each graphical object received from the graphics device interface layer into an intermediate edge-based object graphics format, such that the edges defining the outline of a graphical object are sorted into ascending y-value order, and then into ascending x-value order, assuming a raster scan order of rendering. The output from this first stage is a display list of edges and their associated fill and priority information level (i.e. 'z-order'), along with other information such as whether a particular edge is a clipping edge or a filling edge. The display list is generally referred to as a 'job' and contains all of the information needed to render a page.

The z-order refers to the priority order in which a graphical object is to be rendered within a total set of graphical objects to be rendered for a page. A graphical object having a higher priority can obscure a graphical object having a lower priority, if the graphical object having the higher priority object is opaque. If the higher priority graphical object is semi-transparent, then any of the graphical objects having a lower priority and being positioned beneath the higher priority object can contribute color to the higher priority graphical object when rendered.

The second stage of the rendering process consists of a rendering module 'parsing' the job for a page and generating pixels associated with each scan-line of the page to be rendered. The term parsing refers to the process of deciding whether a string of input symbols is in a given format and if so determining the syntactic structure of the string as defined by that format.

In a graphics rendering system using z-order priority, the edges defining the outlines of a graphical object are monotonically increasing in the direction of rendering, with respect to a scan-line crossing the graphical object. Priority information associated with each of the graphical objects for such a graphics rendering system generally consists of fill data (e.g. a bitmap, a flat color or a tiled image) and an associated fill rule (e.g. non-zero winding or odd-even fill rule). The priority information also comprises a priority value, where the object having the lowest priority has an associated priority value of zero. Further, each of the graphical objects of such a system has information for compositing a particular graphical object onto other graphical objects having a lower priority and which are associated with the graphical objects. Still further, each edge being crossed by a scan-line at a particular point is considered to have a current x-coordinate value, and is considered to be part of a set of active edges for the scan-line Once the above priority information has been determined for all of the graphical objects to be rendered for a page, the edges of the objects are sorted into ascending y-value and ascending x-value order before rendering begins. To then render a scanline, a variable X, representing a pixel position on the scanline, is set to zero and then starting with the first edge in a list of active edges for the scanline, the activating and deactivating priority values associated with each of the edges are processed according to a fill rule until an edge is found with a current x-value which is greater than the variable X (i.e. the next edge to process). Pixels between the position defined by the variable X and the current x-value are then output according to any active objects that fall within the position. If no objects are active in the defined positions then white space is output and the variable X is set to the current x-value. The remaining edges for the scanline are then processed in a similar manner.

The result of processing all object edges crossed at the same point for a particular scanline, is a list of active objects and their associated priority values for that point. The list is sorted from the object having the lowest associated priority value to the object having the highest associated priority value, such that the priority object having the lowest associated priority value is the top-most opaque object. The final resulting color for a pixel run beginning at the crossed edge is then determined by compositing the fill colors of the two lowest priority objects, then compositing the result of this with the fill color of the object having the next highest priority value, and then continuing in a similar manner until the fill color for the object having the highest associated priority value has been composited. For example, FIG. 5 shows a page 500 to be rendered. The page 500 consists of two opaque objects (i.e. squares 501 and 503) on a white background 505. In the example, of FIG. 5, the page 500 is fifty pixels wide. A list of active edges for the scanline 507 on the page 500, arranged in ascending x-value order, is as follows:

(i) edge 509 having a current x-value equal to fifteen;

(ii) edge 511 having a current x-value equal to twenty one;

(iii) edge 513 having a current x-value equal to twenty seven; and (iv) edge 515 having a current x-value equal to forty.

There are five pixel runs identified for the scanline 507. The five pixel runs for the scanline 507 in order are as follows:

(i) 0 to edge 509;

(ii) Edge 509 to edge 511;

(iii) Edge 511 to edge 513;

(iv) Edge 513 to edge 515; and (v) Edge 515 to the end of the scanline 507 (i.e. Pixel 50).

In order to render the scanline 507, initially a variable X is set to zero. At edge 509, the current x-value is equal to 15 which is greater than the value of X and pixels between X=0 and X=15 are output (i.e. white pixels as no objects are active). The variable X is then set to fifteen and the object 501 has an active priority (i.e. ActivePriorityList=Object 501). At the next edge 511, the current x-value is equal to 21 which is greater than the value of X and pixels between edge 509 and edge 511 are output according to the fill of object 501. The variable X is then set to twenty-one and the object 503 has an active priority (i.e. ActivePriorityList=Object 501, Object 503).

The rendering process for the scanline 507 continues at the next edge 513, where the current x-value is equal to twenty-seven which is greater than the value of X and pixels between edge 511 and edge 513 are output according to the fill of priority object 503. The variable X is set to twenty-seven and object 501 is deactivated (i.e. ActivePriorityList= Object 503). At the next edge 515, the current x-value is equal to forty which is greater than the value of the variable X and pixels between edge 513 and edge 515 are output according to the fill of object 503. The variable X is then set to forty and object 503 is deactivated (i.e. ActivePriorityList=Empty). There are no more edges and therefore, the rendering of scanline 507 is completed with white space pixels being output up until the end of scanline 507.

In the example of FIG. 5, two objects (i.e. 501 and 503) were active between edges 511 and 513. However, since object 503 is opaque, only the pixels of object 503 contribute to the final image between the edges 511 and 513. Thus, regardless of the number of active objects for a pixel run, if the top-most object is opaque, then only the fill for this object needs to be output.

As another example, FIG. 6 shows a scanline 601, crossing three objects 602, 603 and 604. In the example of FIG. 6, object 604 is semi-transparent, meaning any objects underneath the object 604 may contribute color when the object 604 is rendered. In this case, object 603 is opaque and is the only object that contributes to the color of the object 604. The edge-list for the scanline 601 is as follows:

edge 605, edge 607, edge 609, edge 611, edge 613 and edge 615.

For the pixel run between edges 609 and 611, the objects 602, 603 and 604 are active. However, since object 603 is opaque, only the pixels for object 603 and object 604 need to be composited, since object 603 is the top-most opaque object (i.e. object 603 is the opaque object having the highest associated priority value).

The result of processing all edges crossing the same point on a scanline is generally a list of the active objects sorted from the object having the lowest associated priority value to the object having the highest associated priority value, such that the object having the lowest priority value is the top-most opaque object. The final color is then determined by compositing the fill color of the two objects having the lowest associated priority values, then compositing the result of composition with the object having the next highest priority value, and then continuing until the object having the highest associated priority value has been composited.

One known method of rendering an image using priority information is to maintain an active priority list as a linked list of objects and associated priority values. In accordance with this known method, the linked list is sorted using a method known as 'in-place' sorting. When a particular object is activated for a scanline, this object is inserted into the active linked list in sorted order depending on the associated priority value for the object. Conversely, when an object is deactivated, the deactivated object is removed from the active linked priority list. After all of the object edges for a pixel run have been processed, the top-most-opaque object is determined by traversing the active linked priority list from the object having the highest associated priority value to the object having the lowest associated priority value until an opaque object is found, or until all of the objects in the list have been traversed. Although this known method of rendering an image is suitable for small numbers of active objects, performance for the method deteriorates markedly when a large number of objects are activated simultaneously. In such a case each object is inserted into the active priority list and sorted for a given scanline. If the object edges crossed by the scanline occur such that the associated priority value for each edge is greater than the associated priority value of the next object edge, then rendering for the scanline would have an $n^2$ order of complexity where n represents the number of object edges crossed.

Further, in the above described method using an active linked priority list, the same object may have to be added to the list multiple times, since an object can cross a scanline at the same point multiple times. For example, FIG. 7 shows a scanline 701 scanning an object 703. In scanning the object 703, the scanline 701 crosses four edges 705, 707, 709 and 711. For ease of explanation, FIG. 7 also shows the edges 705, 707, 709 and 711 graphically separated from the object 703. The edges 705, 707, 709 and 711 can be processed for the scanline 701 as follows:

(i) Get edge 705 and activate object 703;

(ii) Get edge 707 and deactivate object 703;

(iii) Get edge 709 and activate object 703; and (iv) Get edge 711 and output a pixel run up to edge 711 with fill associated with object 703 since object 703 is active.

Hence, removing an object and associated priority value from a sorted priority list is inefficient if the object must be reinserted again at a later time. However, in order to address the inefficiency of reinserting objects into a priority list, a further known method of rendering an image using priority information maintains an active priority list as a linked list of objects and associated priority values and when an object is activated, the object is marked as being active. Conversely, in accordance with this further known method, when an object is deactivated, then the object is marked as being inactive but the object is not removed from the priority list. When the object is reactivated, then the object is marked as being active, and so on. When all of the object edges for a scanline have been processed fox a pixel run, then all deactivated objects are removed from the list, and an active top-most opaque object is found in a similar manner to the method discussed above.

The method of marking an object as either active or inactive is more efficient than the method of removing an inactive object from a priority list since an object can be activated and deactivated several times without needing to be reinserted into the priority list. However, the method of marking objects does not improve performance when a large number of objects are activated simultaneously as discussed above.

Still another known method of rendering objects using priority information, maintains an active priority list as a linked list of objects and associated priority values and when an object is activated, the object is added to the head of the priority list. Conversely, using this further method, when an object is deactivated, the object is removed from the priority list. When all of the object edges have been processed for a pixel run, the linked list of objects is sorted and since the list contains only activated objects, the list can be traversed to determine a top-most opaque object (i.e. the opaque object having the highest associated priority value). However, the disadvantage of this still further method is the complexity of sorting the linked list of objects and associated priority values. Further, this method of adding a priority object to the head of a priority list requires a large amount of memory since ideally such a method uses a doubly linked list requiring a next pointer and a previous pointer. In a sixty-four bit computer architecture the next and previous pointers both require eight bytes each, for each priority object. For example if there are 32000 priority objects, and all of the objects were activated, then there would be at least 512000 bytes (i.e. 512K) of memory required simply for pointers to manage the doubly linked list.

Still another known method of rendering objects using priority information, maintains an array of memory based on the size of the largest possible priority value, N. In this method, an active priority list of size N is provided. When a priority object is activated, an active priority list priority number, associated with the activated priority object, is set to TRUE. When a priority object is deactivated, the active priority list priority number, associated with the deactivated priority object, is set to FALSE. Once all of the object edges for the scanline have been processed, starting at the end of the active list (i.e. the highest priority value), the first active priority object is determined by traversing the list until an entry, i, in the active priority list is equal to TRUE, for $0 \leq i \leq (N-1)$. If the object for the selected entry is opaque, then the traversal of the list is concluded. Otherwise, the list is again traversed from the object having highest associated priority value to the object having the lowest associated priority value until such an entry having an associated opaque object is found. For example, FIG. 8 shows an active priority list 800 where entries in the list (e.g. 801) representing the priority of associated objects numbered one to twenty, have been set to either TRUE or FALSE. In the example of FIG. 8, starting at the object having the highest associated priority value (i.e. twenty) the list 800 is traversed looking for the first TRUE entry 802 (i.e. the object having a priority value of eighteen). If the object associated with the priority value eighteen is not opaque, then the traversal of the list 800 is continued until the next TRUE entry 803 (i.e. the object having a priority value of eleven) is found. If the object having the associated priority value eleven is not opaque, then the traversal of the list 800 continues until the object having the associated priority value of eight is found. Assuming that object having the associated priority value of eight is opaque, then the fill colors from objects having associated priority values of eight and eleven are composited with the resulting fill color being composited with the fill color of the object having the associated priority value of eighteen and the resulting color is output.

One problem of the method of setting each object in an active priority list as TRUE or FALSE is that the method is required to perform a large number of memory accesses. For example, in a case where there are 32000 possible objects then all 32000 entries may potentially have to be searched after any edge has been processed. To avoid this problem, when a priority object is activated, the active object having the maximum associated priority value can be retained (e.g. by setting a variable MaxPriority=max(MaxPriority, activated priority number)) during processing. However, in this case, if the maximum priority activated was, for example, number thirty two thousand, followed by number three, then number two and number one, then the entire list must still be traversed before the entry for object having the associated priority value of number two is determined as the next active object.

Finally, still another known method of rendering objects using priority information, maintains an array of memory based on the size of the largest possible priority value, N, where each TRUE or FALSE entry is of size one bit. Therefore, since TRUE and FALSE only require the value one or zero, only a single bit is needed to distinguish between an active object and a non-active object in an active priority list. FIG. 9 shows an active priority list 900 where each of the entries (e.g. 901) for objects numbered one to twenty have an associated bit (e.g. 902), where one represents TRUE and zero represents FALSE. The values of the bit entries corresponding to the objects, numbered one to twenty for the list 900, can be represented and stored in hexadecimal format as 0H11204. This method where each TRUE or FALSE entry is of size one bit is similar to the method described in the preceding paragraph, although the required memory search space has been reduced by a factor of eight. However, a significant speed penalty is still incurred using this one bit method, since a potentially large number of object entries may still be required to be traversed in order to find the opaque object having highest associated priority value.

SUMMARY OF THE INVENTION

It is an object of the present invention to substantially overcome, or at least ameliorate, one or more disadvantages of existing arrangements.

According to one aspect of the present invention there is provided a method of determining graphical objects contributing to a run of pixels for a scanline in a graphics rendering system, said method comprising the steps of:

forming a first array representing graphical objects associated with said run of pixels, said first array being sorted in an order from a top-most graphical object to a bottom-most graphical object;

updating said first array upon activation or deactivation of a graphical object by said scanline using a second array representing empty locations in said first array; and traversing said first array in said order to determine graphical objects contributing to said run of pixels.

According to another aspect of the present invention there is provided a method of determining graphical objects contributing to a run of pixels for a scanline in a graphics rendering system, said method comprising the steps of:

forming a first array representing graphical objects associated with said run of pixels, said first array being sorted in an order from a top-most graphical object to a bottom-most graphical object, wherein when a graphical object is activated by said scanline a value representing said activated graphical object is added to said first array at a location indicated by a second array representing empty locations in said first array; and traversing said first array in said order to determine graphical objects contributing to said run of pixels.

According to still another aspect of the present invention there is provided an apparatus for determining graphical objects contributing to a run of pixels for a scanline in a graphics rendering system, said apparatus comprising:

first array generating means for forming a first array representing graphical objects associated with said run of pixels, said first array being sorted in an order from a top-most graphical object to a bottom-most graphical object;

updating means for updating said first array upon activation or deactivation of a graphical object by said scanline using a second array representing empty locations in said first array; and traversing means for traversing said first array in said order to determine graphical objects contributing to said run of pixels.

According to still another aspect of the present invention there is provided an apparatus for determining graphical objects contributing to a run of pixels for a scanline in a graphics rendering system, said apparatus comprising:

first array forming means for forming a first array representing graphical objects associated with said run of pixels, said first array being sorted in an order from a top-most graphical object to a bottom-most graphical object, wherein when a graphical object is activated by said scanline a value representing said activated graphical object is added to said first array at a location indicated by a second array representing empty locations in said first array; and traversing means for traversing said first array in said order to determine graphical objects contributing to said run of pixels.

According to still another aspect of the present invention there is provided a program including computer implemented program code for determining graphical objects contributing to a run of pixels for a scanline in a graphics rendering system, said program comprising:

code for forming a first array representing graphical objects associated with said run of pixels, said first array being sorted in an order from a top-most graphical object to a bottom-most graphical object;

code for updating said first array upon activation or deactivation of a graphical object by said scanline using a second array representing empty locations in said first array; and code for traversing said first array in said order to determine graphical objects contributing to said run of pixels.

According to still another aspect of the present invention there is provided a program including computer implemented program code for determining graphical objects contributing to a run of pixels for a scanline in a graphics rendering system, said program comprising:

code for forming a first array representing graphical objects associated with said run of pixels, said first array being sorted in an order from a top-most graphical object to a bottom-most graphical object, wherein when a graphical object is activated by said scanline a value representing said activated graphical object is added to said first array at a location indicated by a second array representing empty locations in said first array; and code for traversing said first array in said order to determine graphical objects contributing to said run of pixels.

Other aspects of the invention are also disclosed.

BRIEF DESCRIPTION OF THE DRAWINGS

One or more embodiments of the present invention will now be described with reference to the drawings, in which:

FIG. 8 shows an active priority list where entries in the list representing objects and associated priority values numbered one to twenty, have been set to either TRUE or FALSE;

FIG. 9 shows an active priority list where each of the object entries have an associated bit representing TRUE or FALSE for the corresponding object;

DETAILED DESCRIPTION INCLUDING BEST MODE

Figure 1:
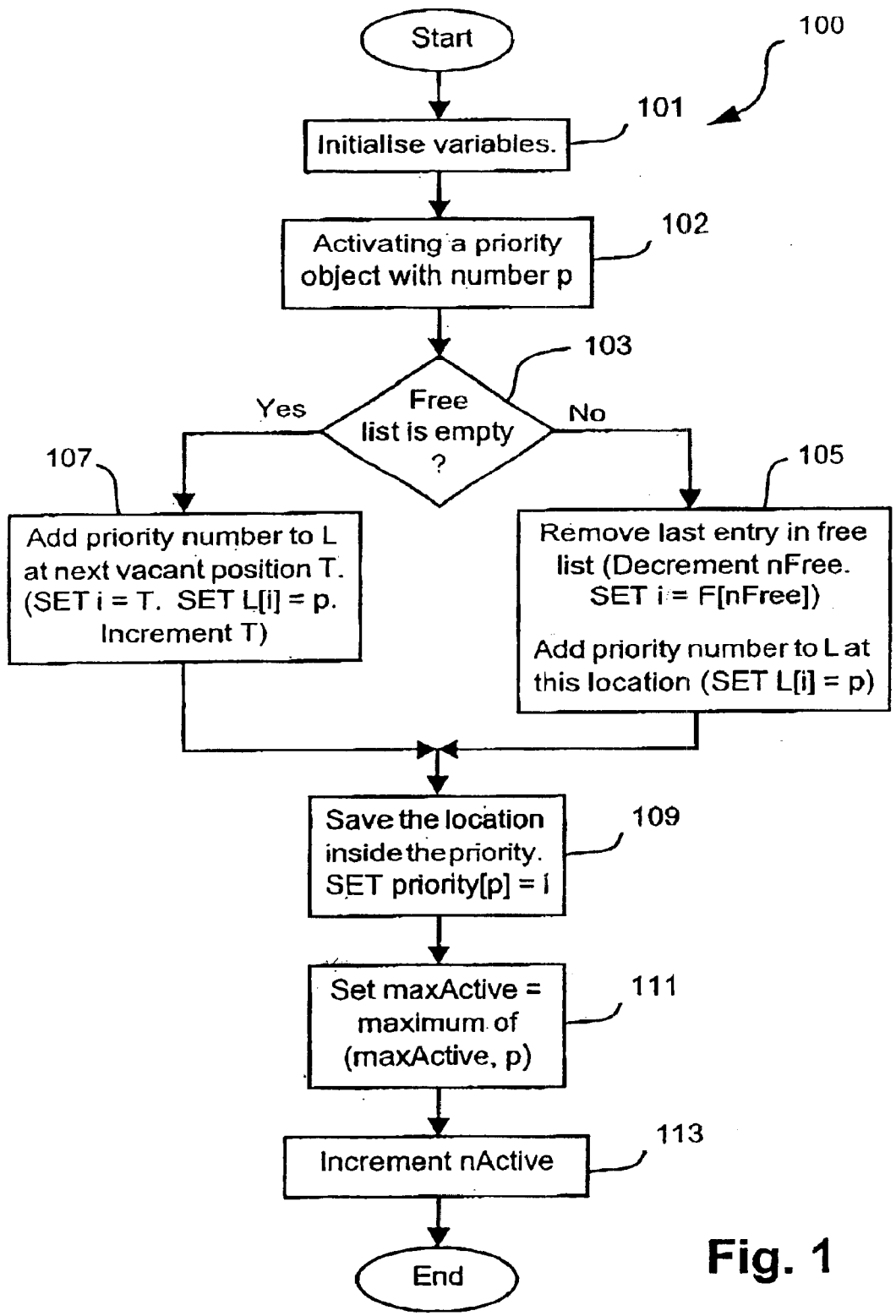
FIG. 1 is a flow diagram showing a method of activating an object.

Where reference is made in any one or more of the accompanying drawings to steps and/or features, which have the same reference numerals, those steps and/or features have for the purposes of this description the same function(s) or operation(s), unless the contrary intention appears.

Figure 3:
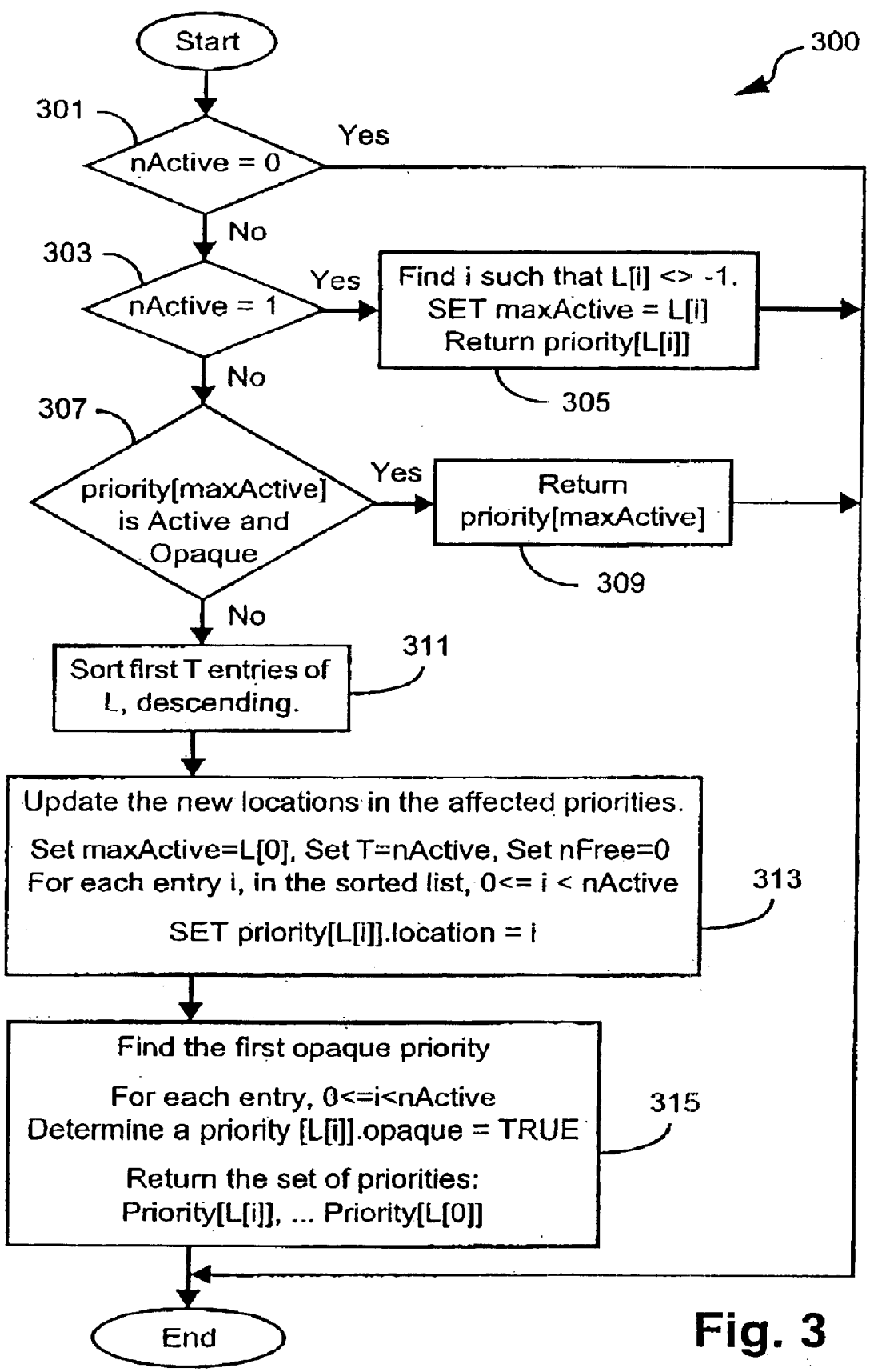
FIG. 3 is a flow diagram showing a method of determining active objects contributing to a run of pixels on a scanline.
Figure 10:
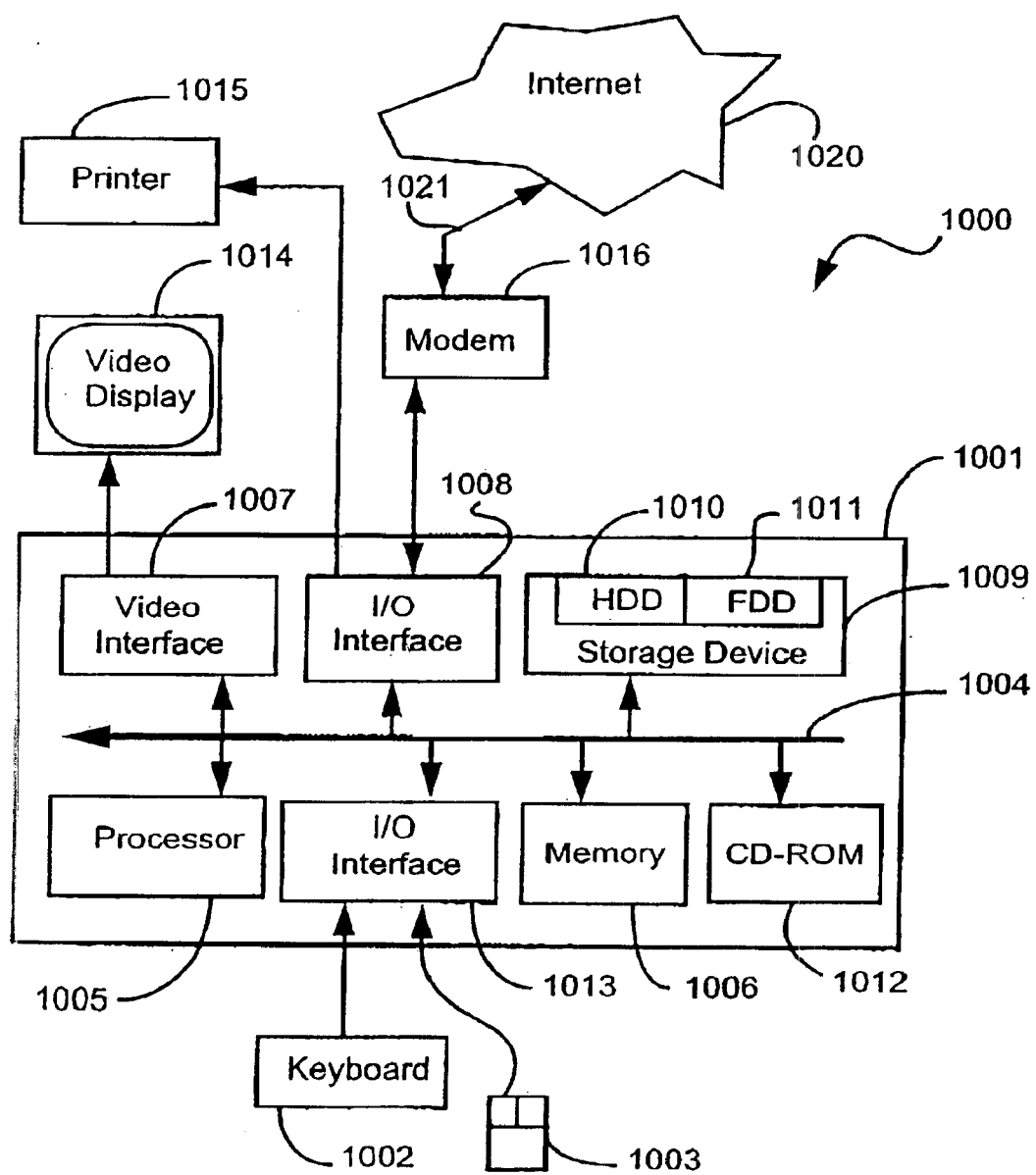
FIG. 10 is a schematic block diagram of a general-purpose computer upon which arrangements described can be practiced.

FIG. 3 is a flow diagram showing a method 300 of determining active objects contributing to a run of pixels corresponding to a scanline. The method 300 is preferably practiced using a general-purpose computer system 1000, such as that shown in FIG. 10 wherein the described method 300 can be implemented as software, such as an application program executing within the computer system 1000. In particular, the steps of the described method 300 are effected by instructions in the software that are carried out by a processor 1005 of the computer system 1000. The instructions may be formed as one or more code modules, each for performing one or more particular tasks. The software may also be divided into two separate parts, in which a first part performs the described method and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the method 300 described herein.

The computer system 1000 comprises a computer module 1001, input devices such as a keyboard 1002 and mouse 1003, output devices including a printer 1015 and a display device 1014. A Modulator-Demodulator (Modem) transceiver device 1016 is used by the computer module 1001 for communicating to and from a communications network 1020, for example connectable via a telephone line 1021 or other functional medium. The modem 1016 can be used to obtain access to the Internet, and other network systems, such as a Local Area Network (LAN) or a Wide Area Network (WAN).

The computer module 1001 typically includes at least one processor unit 1005 as mentioned above, a memory unit 1006, for example formed from semiconductor random access memory (RAM) and read only memory (ROM), input/output (I/O) interfaces including a video interface 1007, and an I/O interface 1013 for the keyboard 1002 and mouse 1003 and optionally a joystick (not illustrated), and an interface 1008 for the modem 1016. A storage device 1009 is provided and typically includes a hard disk drive 1010 and a floppy disk drive 1011. A magnetic tape drive (not illustrated) may also be used. A CD-ROM drive 1012 is typically provided as a non-volatile source of data. The components 1005 to 1013 of the computer module 1001, typically communicate via an interconnected bus 1004 and in a manner which results in a conventional mode of operation of the computer system 1000 known to those in the relevant art. Examples of computers on which the described arrangements can be practised include IBM-PC's and compatibles, Sun Sparcstations or alike computer systems evolved therefrom.

Typically, the application program is resident on the hard disk drive 1010 and read and controlled in its execution by the processor 1005. Intermediate storage of the program and any data fetched from the network 1020 may be accomplished using the semiconductor memory 1006, possibly in concert with the hard disk drive 1010. In some instances, the application program may be supplied to the user encoded on a CD-ROM or floppy disk and read via the corresponding drive 1012 or 1011, or alternatively may be read by the user from the network 1020 via the modem device 1016. Still further, the software can also be loaded into the computer system 1000 from other computer readable media. The term "computer readable medium" as used herein refers to any storage or transmission medium that participates in providing instructions and/or data to the computer system 1000 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1001. Examples of transmission media include radio or infra-red transmission channels as well as a network connection to another computer or networked device, and the Internet or Intranets including email transmissions and information recorded on websites and the like.

Figure 11:
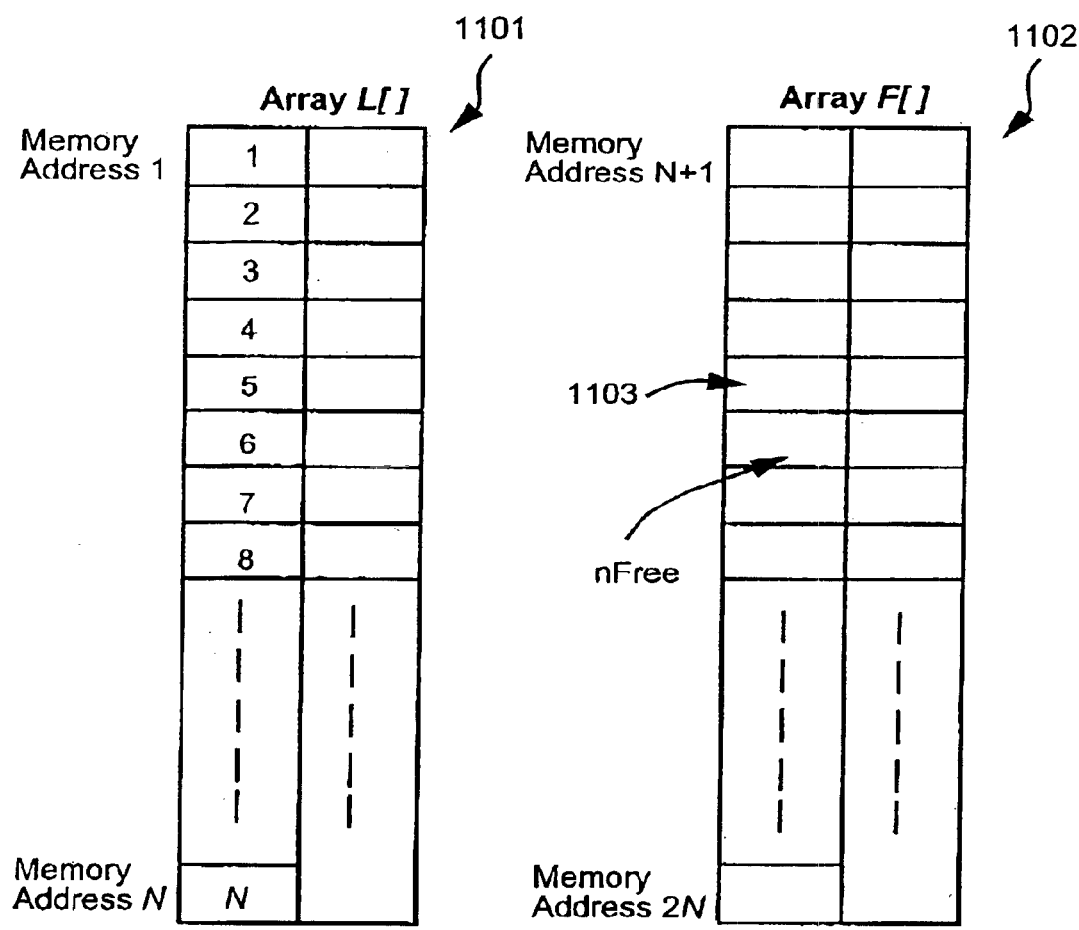
FIG. 11 shows two memory integer arrays utilised in the method of determining active objects contributing to a run of pixels on a scanline.

The method 300 of determining active objects contributing to a run of pixels corresponding to a scanline is preferably implemented as part of a graphics device interface layer executing on the computer system 1000. The method 300 utilises two memory 1006 integer arrays 1101 and 1102 of size N, as seen in FIG. 11, where N represents the number of objects in a job to be rendered. The first array 1101 is an active priority list and is preferably stored in memory 1006. The first array 1101 will be hereinafter referenced as the 'active priority list (i.e. L[ ])'. The second array 1102 is an array of pointers (i.e. indexes) that indicate vacant memory 1006 locations in the active priority list 1101, when an object is deactivated. The second array 1102 will be hereinafter referred to as a 'free list (F[ ])' and is also preferably stored in memory 1006. As seen in FIG. 11, the active priority list 1101 and free list 1102 can be stored at consecutive memory 1006 addresses (e.g. Memory address 0 to memory address 2N) or alternatively, the active priority list 1101 and free list 1102 can be stored in any suitable free memory 1006 locations.

FIG. 1 is a flow diagram showing a method 100 of activating an object. The method 100 is preferably implemented as a software program stored in memory 1006 or the storage device 1009 and is executed by the processor 1005 of the computer system 1000. The method 100 begins at step 101, where several variables are initialised by the processor 1005 according to the code sequence as shown in Appendix 1. The number of active objects (i.e. nActive), is set to zero and the number of touched entries, T, in the active priority list 1101 (i.e. L[ ]), is set to zero. Further, the maximum activated priority (i.e. maxActive) is set to a number smaller than the minimum allowed priority value (e.g. −1 if the minimum allowed priority value is zero) and the number of entries in the free-list 1102 (i.e. nFree), is set to zero. At the next step 102, an object having priority number p is activated by a scanline crossing an edge of the object. At the next step 103, the processor 1005 determines if the freelist 1102 is empty (i.e. nFree=0) and if the free list 1102, is not empty (e.g. due to a previous object deactivation), then the method 100 proceeds to step 105. Otherwise, the method 100 proceeds to step 107. At step 105, nFree is decremented by one and the entry 1103 corresponding to the memory location within F of the decremented value of nfree (i.e. F[nFree]) is read by the processor 1005 (i.e. SET i=F[nFree], where i represents a vacant entry in array L into which the priority number p can be added), and the priority value associated with the object is added to the active priority list 1101 (i.e. SET L[i]=p) at the location specified by i. Otherwise, at step 107, the processor 1005 adds the priority number p to the next available location T (i.e. SET i=T, SET L[i]=p) in the active priority list 1101 stored in memory 1006, and the variable T is incremented by one.

The method 100 continues at the next step 109, where the location of the object in the active priority list 1101 is stored in memory 1006 and is associated with the object itself (i.e. SET priority[p]=i). Thus, when the object is deactivated the location of the object in the active priority list 1101 is known to the processor 1005. At the next step 111, if p is higher than the maximum activated priority value (i.e. maxActive), then maxActive is set to the value of p. The method 100 concludes at step 113, where the number of active objects (i.e. nActive) is incremented by one.

Figure 2:
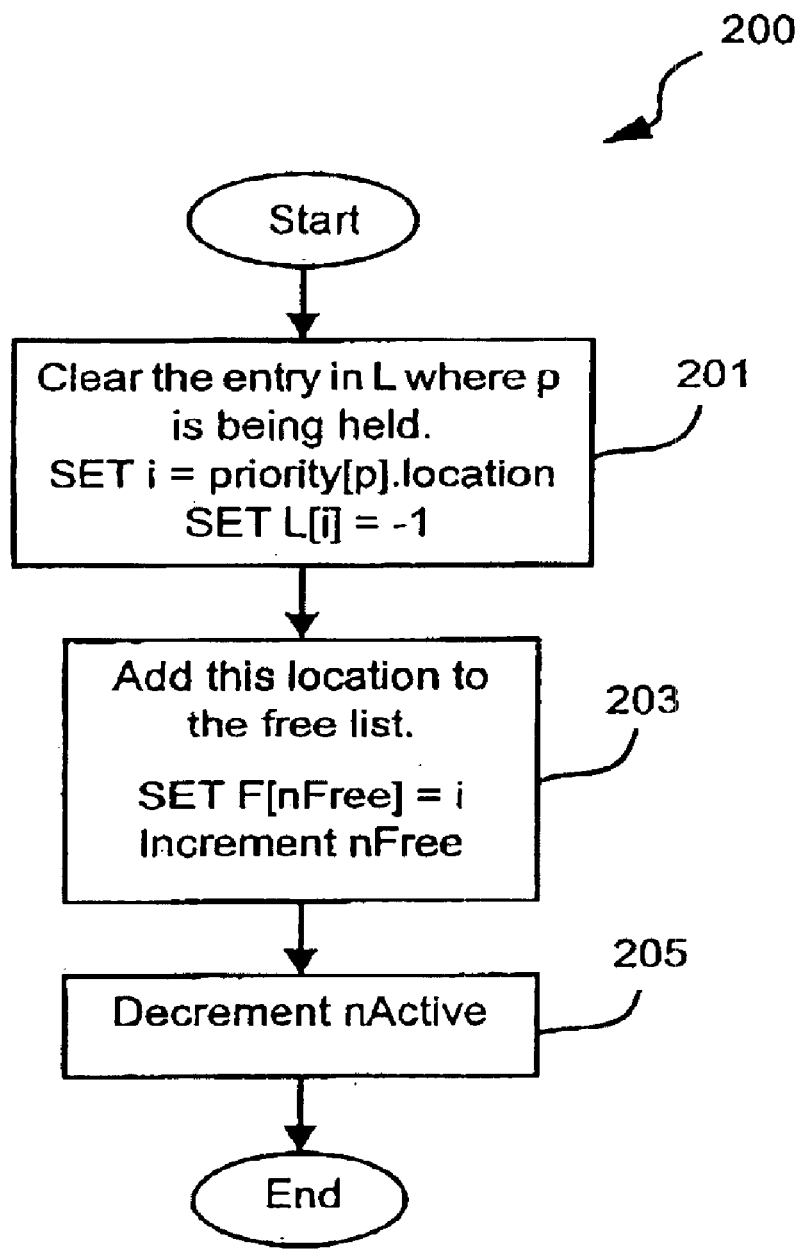
FIG. 2 is a flow diagram showing a method of deactivating an object.

FIG. 2 is a flow diagram showing a method 200 of deactivating an object. The method 200 is preferably implemented as a software program stored in memory 1006 or the storage device 1009 and is executed by the processor 1005 of the computer system 1000. The method 200 begins at the first step 201, where an object is deactivated, and the memory 1006 address of the active priority list 1101 corresponding to the deactivated object, is overwritten with a value less than the minimum allowed priority value, for example negative one (i.e. SET i=priority [p], SET L[i]=−1). At the next step 203, the overwritten memory 1006 address of the active priority list 1101 is added to the end of the free list 1102, as an index to the overwritten memory 1006 address (i.e. SET F[nFree]=i) and nFree is incremented by 1. The method 200 concludes at the next step 205, where the number of active objects (i.e. nActive) is decremented by one.

Thus as described above, the methods 100 and 200 of activating and deactivating objects do not require in-place active priority list sorting to be performed during object activation and deactivation. A further advantage of the methods 100 and 200 are that these methods 100 and 200 only require memory 1006 space for 2×N integers. Still further, by saving vacant memory 1006 locations for the active priority list 1101 in the free list 1102 during deactivation, and by always checking the free list 1102 before adding values to the end of the active priority list 1101 during activation, only N memory 1006 locations are ever required for the active objects. The free list 1102 also ensures maximum reuse of memory 1006 locations in the active priority list 1101.

Once all of the object edges associated with a scanline have been processed for a pixel run, the first T entries in the active priority list 1101 represent the objects that were crossed during the scanning process for that scanline. The active priority list 1101 may contain entries for deactivated objects, since T will be greater than or equal to the number of active objects (i.e. nActive), depending on the order in which the objects were activated and deactivated for a particular scanline.

Figure 12:
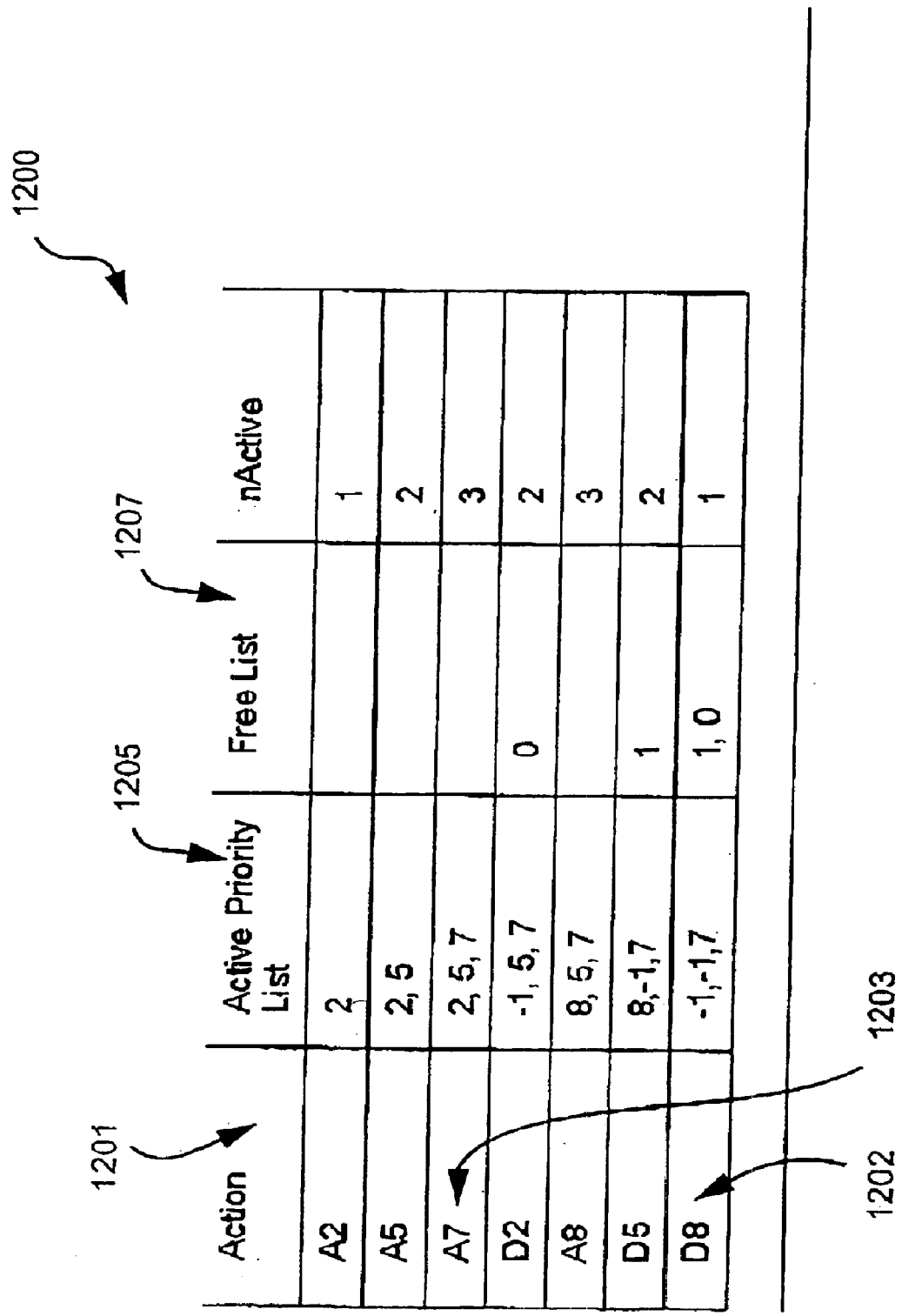
FIG. 12 is a table showing a series of object activations and deactivations and the contents of the active priority list and the free list corresponding to the object activations and deactivations.
Figure 13:
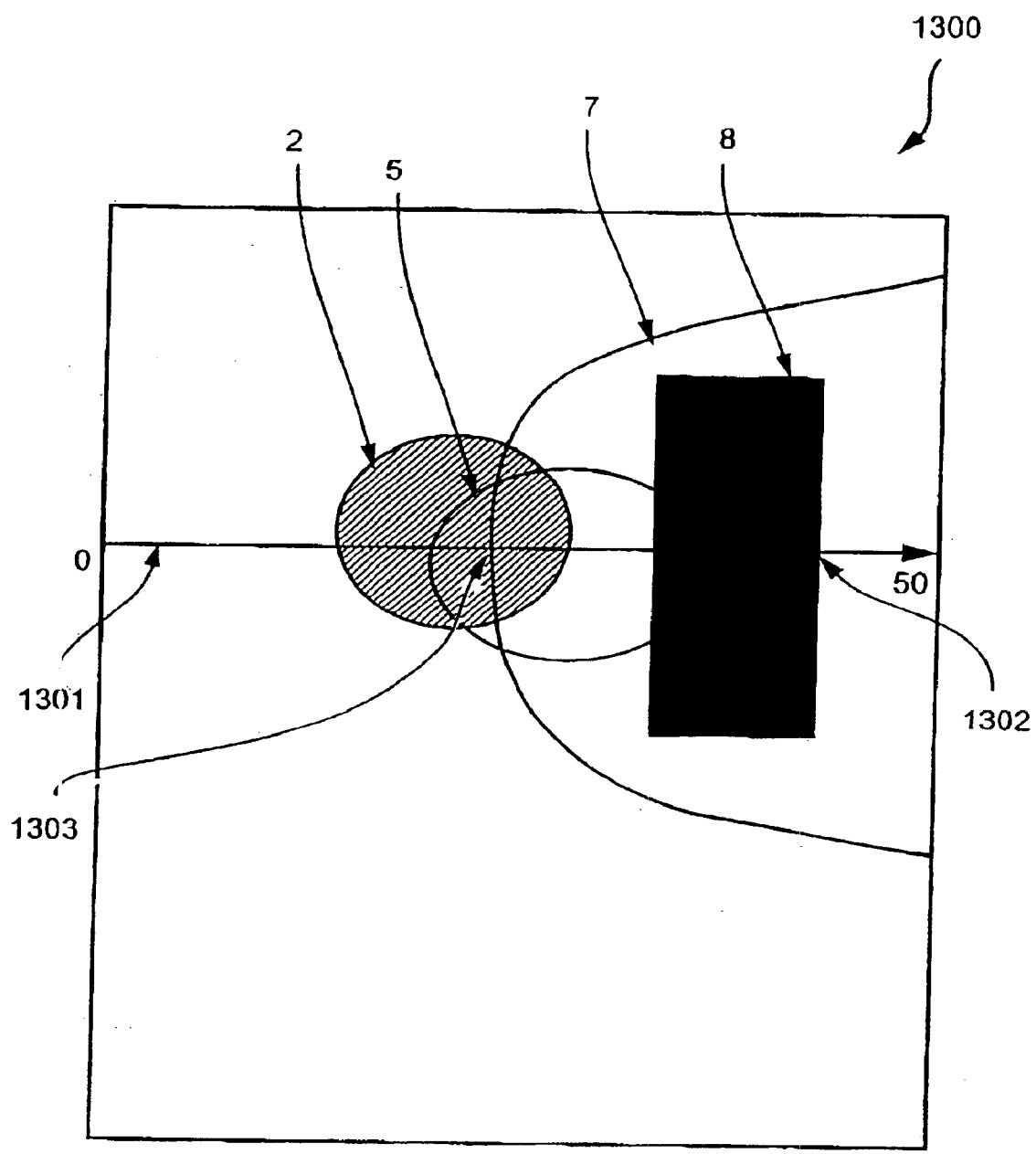
FIG. 13 shows a scanline crossing four objects.

The method 300 of determining active objects contributing to a run of pixels for a scanline will now be described with reference to a table 1200 of FIG. 12. The method 300 will also be described with reference to a page 1300 of four objects (i.e. object 2, object 5 object 7 and object 8), as seen in FIG. 13, scanned by the scanline 1301 which is fifty pixels long. The object labels also represent the priorities of the respective objects. The table 1200 shows a series of activations and deactivations for object 2, object 5, object 7 and object 8, and the contents of both an active priority list 1205 and a free list 1207 corresponding to the object activations and deactivations. The object activations and deactivations are performed in accordance with the methods 100 and 200 described above. In the table 1200 of FIG. 12, the letter 'A' represents an activation and the letter 'D' represents a deactivation. For example, the 'A2' in the action column 1201 represents that object 2 has been activated. As seen in FIG. 12, when object 8 is deactivated, as at point 1302, and as indicated in row 1202 of the table 1200, the contents of the active priority list are: [−1, −1, 7], and T=3 where T represents the number of entries in the active priority list 1205 that were touched during the scan. The number of active objects (i.e. nActive) after the deactivation of object 8 is one, being object 7 which was activated by the scanline 1301 at point 1303, as indicated in row 1203 of table 1200.

The method 300 of determining active objects contributing to a run of pixels for a scanline, begins at step 301. If the processor 1005 determines that the number of active objects (i.e. nActive) is zero, then no objects contribute pixels to the sun, white space pixels are output and the method 300 concludes. Otherwise, the method 300 proceeds to step 303, where if the number of active objects (i.e. nActive) is equal to one, then the method 300 proceeds to step 305. Otherwise the method 300 proceeds to step 307. At step 305, the processor 1005 searches the active priority list (e.g. 1205) stored in memory 1006 to determine a first priority value not equal to negative one, indicating that the corresponding object contributes pixels to the pixel run. In the example of FIG. 13, object 7 is returned by the processor 1005 as the only object contributing pixels (i.e. opaque or not) to the pixel run from point 1302 to the end of the scanline 1301 (i.e. pixel 50). Thus, the maximum activated priority (i.e. maxActive) is set to this value (i.e. 7) and the method 300 concludes.

At step 307, an active object p having the highest priority value is determined and if the corresponding object is opaque, then the object p is the only object contributing pixels to the pixel run and the method 300 proceeds to step 309. Otherwise, if the highest priority object is not opaque then the method 300 proceeds to step 311. At step 309, the highest activated priority object p is returned by the processor 1005 and the method 300 concludes. In the example of FIG. 13, the maximum activated priority object was object 8. However, since object 8 was deactivated at the point 1302, object 8 does not contribute any pixels to the pixel run from point 1302 to the end (i.e. pixel 50) of the scanline 1301.

The method 300 continues at the next step 311, where the first T entries of the active priority list (e.g. 1205) are sorted in descending priority value order. A non-recursive quicksort algorithm is preferably used for performing step 311. However, any other suitable sorting algorithm such as an insertion sort, can be used for performing step 311. At the next step 313, since positions of the objects in the active priority list 1205, have now changed due to the sorting, each active object in the active priority list is then re-set with a new location in the active priority list L. maxActive is set to a first entry in the active priority list denoted by L[0], T is set to nActive and nFree is reset to zero. After step 311 has been performed, the active priority list 1205 is partitioned such that the first N entries are active objects, and the remaining T-N entries are inactive objects having a value of negative one. The list of objects to composite from last object to first object is priority[L[0]], priority[L[1]], . . . , priority[L[i]], where 0<=i<nActive, and priority[L[i]] is the first opaque object. The method 300 concludes at step 315, where the first opaque object in the active priority list 1205 is determined and returned as the set of objects up to the first opaque object. If no object was opaque, then the entire set of objects in the active priority list 1205 is returned.

Figure 4:
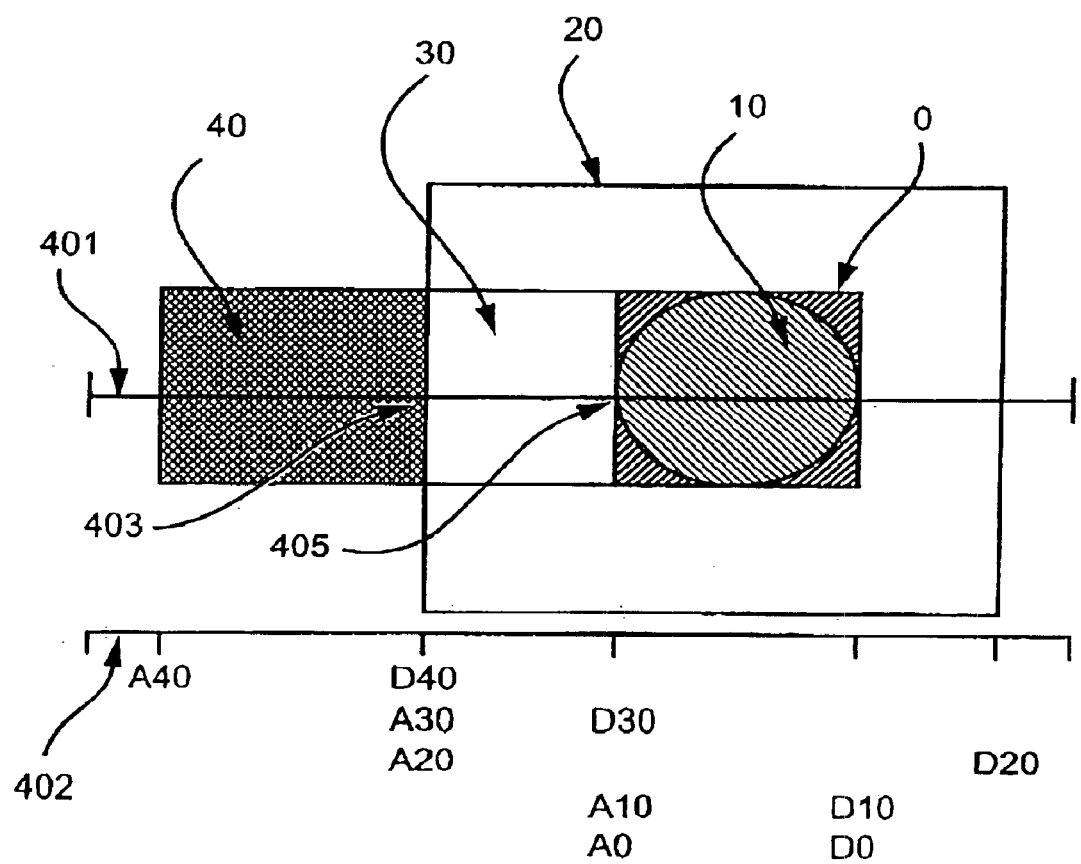
FIG. 4 shows a scanline crossing five objects.
Figure 5:
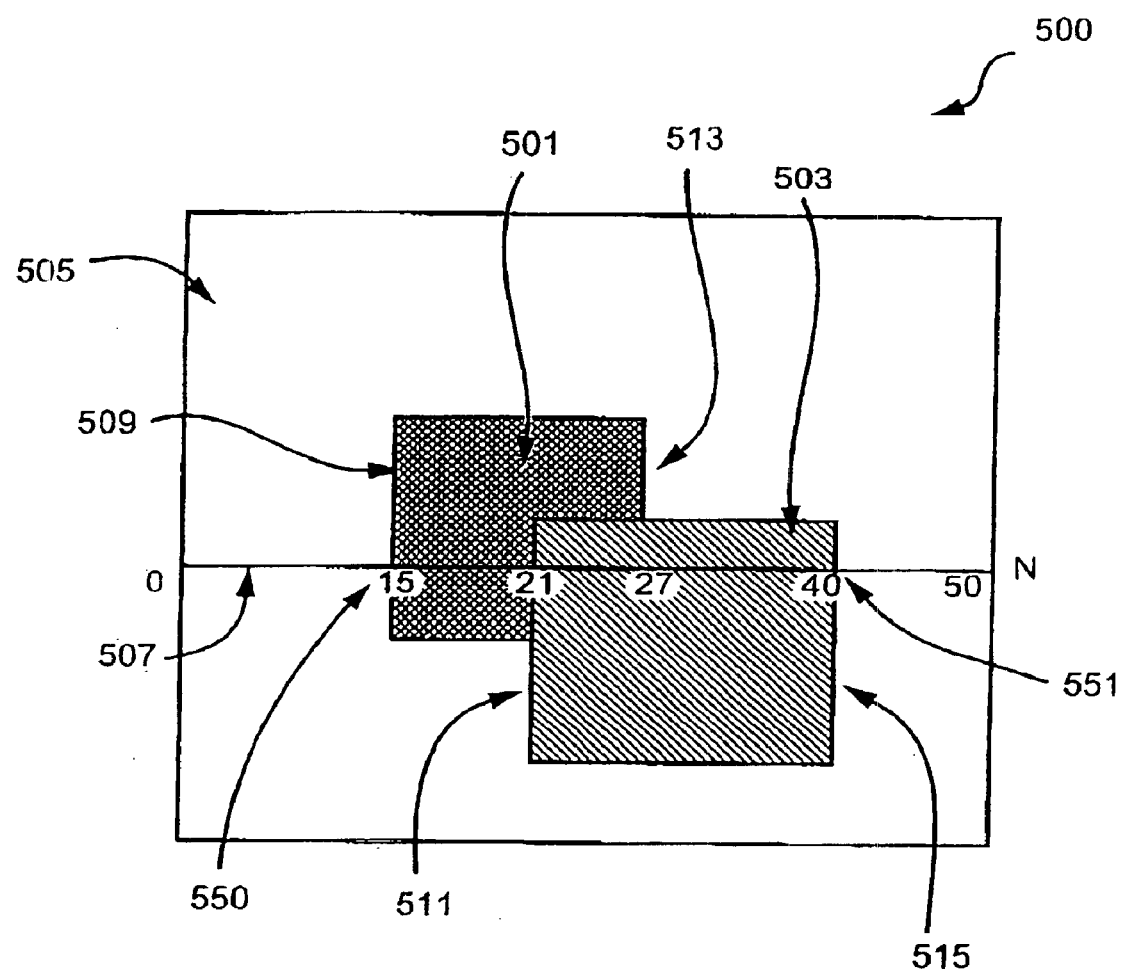
FIG. 5 shows a page to be rendered, consisting of two objects on a white space background.
Figure 6:
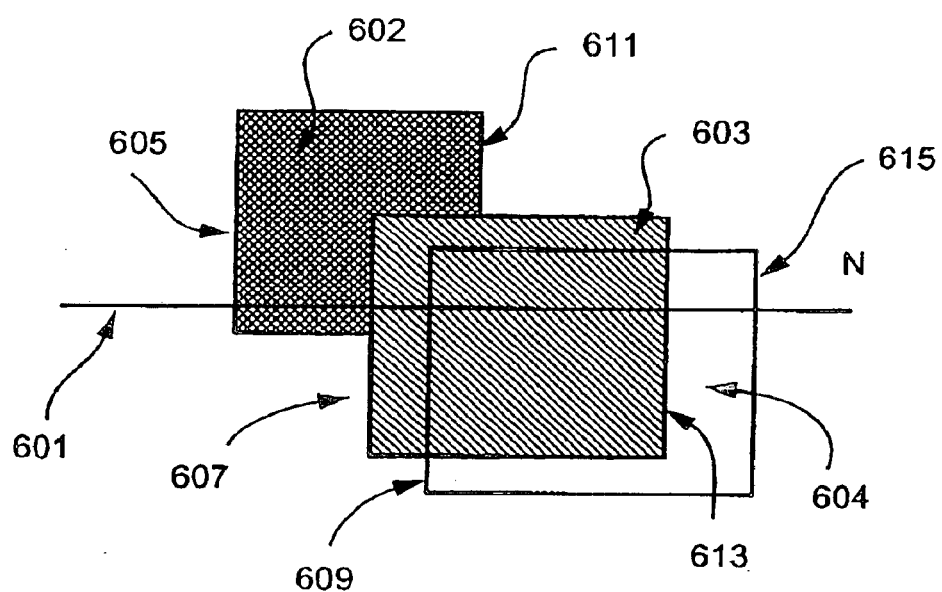
FIG. 6 shows a scanline crossing three objects.
Figure 7:
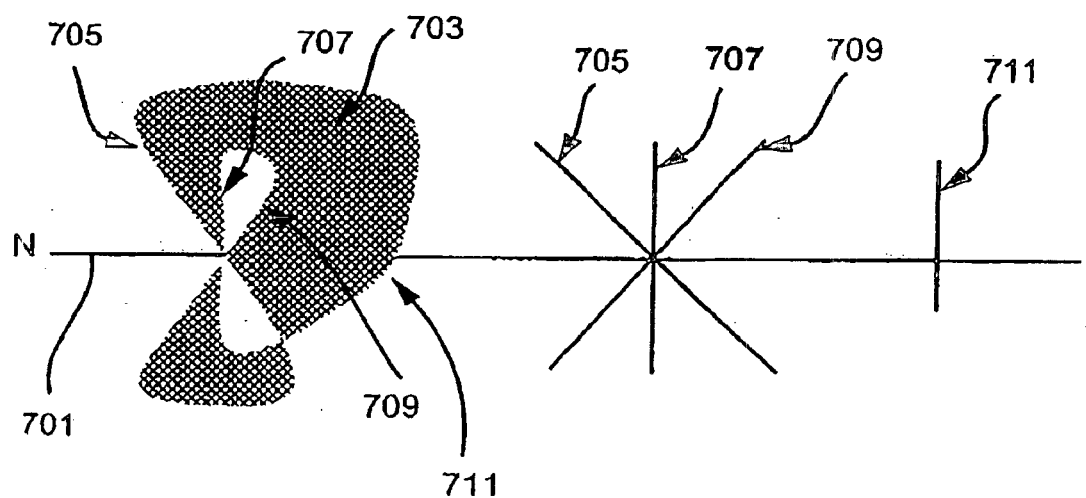
FIG. 7 shows a scanline scanning an object having multiple edges.

As a further example, FIG. 4 shows a scanline 401 crossing five objects, object 0, object 10, object 20, object 30 and object 40, where object 0 is opaque, object 10 is transparent, object 20 is transparent, object 30 is transparent and object 40 is opaque. Ib this instance, the object priorities are equal to their respective labels divided by ten (i.e., 10). FIG. 4 also shows an activation/deactivation line 402 indicating which of the objects 0, 10, 20, 30 and 40 are activated for each edge crossing. Again, the letter 'A' represents an object activation and the letter 'D' represents an object deactivation. For example, at the point 403 of the scanline 401, objects 20 and 30 are activated, and object 40 is deactivated, as indicated by the labels D40, A20 and A30 on the activation/deactivation line 402. Table 1, below, shows the result of each of the object activations and object deactivations occurring for the scanline 401 of FIG. 4. Table 1 also indicates the contents of the active priority and free lists, the number of active objects (nActive) and the priority of the maximum activated priority object (i,e. maxActive). The variable P refers to the array priority [ ] described above.

returns object 20 (i.e. P[20]) and object 10 (i.e. P[10]) for compositing since object 10 is opaque.

The objects returned by the processor 1005 (as at steps 305, 309 and 315 of the method 300) can be joined as a linked list of active objects in compositing order, such that L[i] represents the first object, L[i-1] represents the next object and L[0] is the last object. L[i] is the lowest priority object and L[0] is the highest priority object.

The sorting of the active priority list L only occurs when either there are two or more active objects for an edge crossing and the top-most activated object having value maxActive was either no longer active or active but not opaque.

One advantage of the method 300 is that the sorting of the active priority list is on an array of integers, which allows an

TABLE 1

| Action | Active Priority List | T | Free List | nActive | MaxActive | Result |
|---|---|---|---|---|---|---|
| A40 | 4<br>P[4] = 0 | 1 | | 1 | 4 | nActive is 1.<br>Set maxActive = 4<br>Return P[4] |
| A20 | 4, 2<br>P[2] = 1 | 2 | | 2 | 4 | |
| A30 | 4, 2, 3<br>P[3] = 2 | 3 | | 3 | 4 | |
| D40 | −1, 2, 3 | 3 | 0 | 2 | 4 | nActive is 2.<br>P[maxActive] is not acitve<br>Sort L = 3, 2, −1.<br>Set P[3] = 0, P[2] = 1.<br>Set maxActive = L[0] = 3<br>Set T = 2<br>Set nFree = 0<br>P[3] is transparent, P[2] is transparent.<br>Return P[2], P[3] |
| A0 | 3, 2, 0<br>P[0] = 2 | 3 | | 3 | 3 | |
| A10 | 3, 2, 0, 1<br>P[1] = 3 | 4 | | 4 | 3 | |
| D30 | −1, 2, 0, 1 | 4 | 0 | 3 | 3 | nActive is 3.<br>P[maxActive] is not active<br>Sort L = 2, 1, 0, −1.<br>Set P[2] = 0, P[1] = 1, P[0] =2.<br>Set maxActive = L[0]<br>Set T = 3<br>Set nFree = 0<br>P[2] is transparent. P[1] is opaque. Stop.<br>Return P[2], P[1]. |
| D0 | 2, 1, −1 | 3 | 2 | 2 | 2 | |
| D10 | 2, −1, −1 | 3 | 2, 1 | 1 | 2 | nActive is 1<br>Set maxActive = 2<br>Return P[2] |
| D20 | −1, −1, −1, | 3 | 2, 1, 0 | 0 | 2 | nActive is 0.<br>Return 0 |

The result column of Table 1 shows the object that is returned by the processor 1005 (as at steps 305, 309 and 315 of the method 300) for each of the edge crossings. For example, after processing the deactivation of object 40 (i.e. D40) at edge crossing 403, the only two active priority objects, object 20 (i.e. P[2]) and object 30 (i.e. P[3]) are transparent, so the processor 1005 returns objects 20 and 30 as objects to be composited. Similarly, after processing the deactivation of object 30 (i.e. D30) at edge crossing 405, there are three active objects, object 20 (i.e. P[2]), object 10 (i.e. P[1]) and object 0 (i.e. P[0]), and the processor 1005 optimal sorting implementation. Further, by using a free-list (e.g. 1207), the value of T is kept as small as possible and hence a smaller set of integers can be sorted. Further, no dynamic memory allocation is required for the method 300 and sorting can immediately partition the active from the inactive objects to determine a new top-most-activated object.

The method 300 can alternatively be implemented in dedicated hardware such as one or more integrated circuits performing the functions or sub functions of the method 100, 200 and 300. Such dedicated hardware may include graphic processors, digital signal processors, or one or more microprocessors and associated memories and can be to perform a function similar to a priority encoder.

Figure 14:
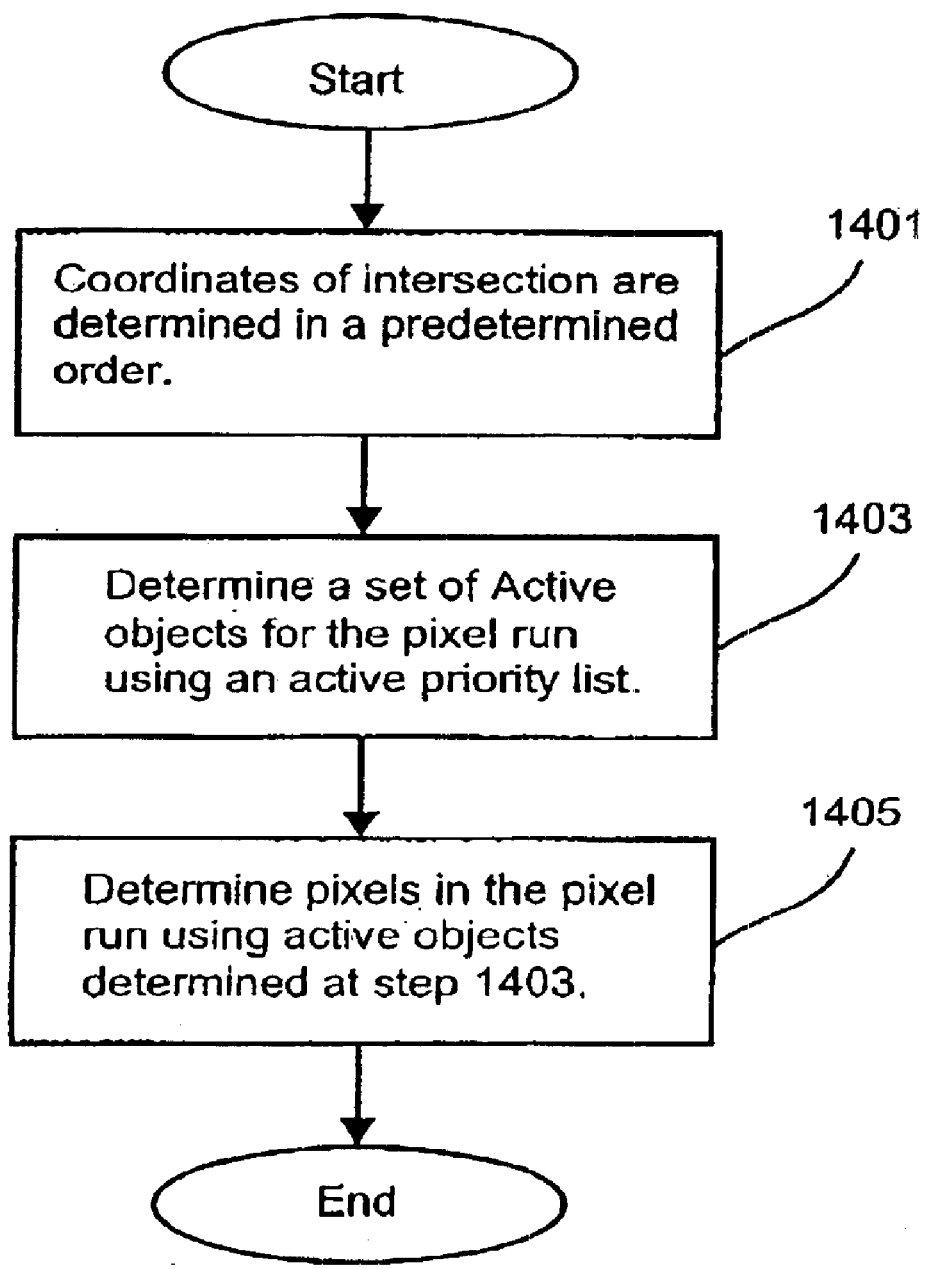
FIG. 14 is a flow diagram showing a method of rendering at least one graphical object described by at least two edges into a raster pixel image having a plurality of scan lines; and Appendix 1 is pseudo code listing showing the variables initialised for a method of determining active priority objects contributing to a run of pixels on a scanline.

FIG. 14 is a flow diagram showing a method 1400 of rendering at least one graphical object described by at least one edge into a raster pixel image having a plurality of scan lines and a plurality of pixel locations on each of the scan lines. The method 1400 uses active priority lists determined in accordance with the method 300 described above. The method 1400 is preferably implemented as a software program stored in memory 1006 or the storage device 1009 and is executed by the processor 1005 of the computer system 1000. The method 1400 begins at step 1401, where the processor 1005 determines coordinates of intersection of those edges of the objects that intersect the scan line in a predetermined order (e.g. ascending y-value and ascending x-value order) and stores the coordinates in memory 1006. Preferably, an edge is considered as a single entity and if necessary, is partitioned to delineate sections of the edge that may be described in different formats, a specific goal of which is to ensure a minimum level of complexity for the description of each section. The different formats of the edges can include straight edges (simple vectors) that traverse from one point on the display device 1014 to another, or an orthogonal edge format where a two-dimensional object is defined by a plurality of edges including orthogonal lines. Further formats, where objects are defined by continuous curves, are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

At the next step 1403, for each adjacent pair of edge intersections, the processor 1005 determines an active priority list in accordance with the method 300 and information associated with the object is examined to determine a set of active objects for a span of pixel locations between the corresponding pair of edge intersections. At the next step 1405, for each run of pixel locations, the processor determines a value for each of the locations within the run using the corresponding set of active objects and information (e.g. fill and an associated fill rule) associated with the active objects. The pixel values determined for each of the locations in the run can be stored in memory 1006 or rendered on the display device 1014, for example.

The foregoing describes only some embodiments of the present invention, and modifications and/or changes can be made thereto without departing from the scope and spirit of the invention, the embodiments being illustrative and not restrictive.

APPENDIX 1

SET nActive = 0
SET T=0(number of entries touched in L)
SET maxActive = −1
SET nFree = 0

What is claimed is:

1. A method of determining graphical objects contributing to a run of pixels for a scanline in a graphics rendering system, said method comprising the steps of:

forming a first array for referencing active graphical objects associated with said run of pixel;

forming a second array for indicating empty memory locations in said first array;

updating said first array upon activation or deactivation of a graphical object by said scanline using said second array, wherein when a graphical object is deactivated by said scanline the memory location of the deactivated graphical object in said first array is added to said second array and the deactivated graphical object is flagged in said first array, the flag indicating that the deactivated object does not contribute to said run of pixels; and traversing said first array to determine a top-most opaque object without an associated flag, the top-most opaque object being considered to contribute to said run of pixels.

2. A method according to claim 1, wherein when a graphical object is activated by said scanline a value representing the activated graphical object is added to said first array at a memory location indicated by said second array.

3. A method according to claim 2, wherein, if the value representing the activated graphical object is greater than a second value representing a current top-most active object, then the second value representing the current top-most active object is set to the value.

4. A method according to claim 3, wherein if the current top-most active object is still active and is opaque then the current top-most active object is considered to contribute to said run of pixels, otherwise said first array is sorted such that one or more top-most locations of said first array represent active objects contributing to said run of pixels.

5. A method according to claim 4, wherein graphical objects corresponding to said run of pixels are represented as a linked list of graphical objects.

6. A method according to any one of claims 1, 2, and 3–5, wherein said first and second arrays are integer arrays.

7. A method according to claim 1, wherein said first array is sorted in an order from a top-most graphical object to a bottom-most graphical object.

8. A method of determining graphical objects contributing to a run of pixels for a scanline in a graphics rendering system, said method comprising the steps of:

forming a first array for referencing active graphical objects associated with said run of pixels;

forming a second array for indicating empty memory locations in said first array, wherein when a graphical object is activated by said scanline a value representing the activated graphical object is added to said first array at a memory location indicated by said second array, and when a graphical object is deactivated by said scanline the memory location of the deactivated graphical object in said first array is added to said second array and the deactivated graphical object in said first array is flagged, the flag indicating that the deactivated object does not contribute to said run of pixels; and traversing said first array to determine a top-most opaque object without an associated flag, the top-most opaque object being considered to contribute to said run of pixels.

9. A method according to claim 8, wherein if the value representing the activated graphical object is greater than a second value representing a current top-most active object, then the second value representing the current top-most active object is set to the value.

10. A method according to claim 9, wherein if the current top-most active object is still active and is opaque then the current top-most active object is considered to contribute to said run of pixels, otherwise said first array is sorted such that one or more top-most locations of said first array represent active objects contributing to said run of pixels.

11. A method according to claim 10, wherein graphical objects corresponding to said run of pixels are represented as a linked list of graphical objects.

12. A method according to any one of claims 8 and 9–11, wherein said first and second arrays are integer arrays.

13. A method according to claim 8, wherein said first array is sorted in an order from a top-most graphical object to a bottom-most graphical object.

14. An apparatus for determining graphical objects contributing to a run of pixels for a scanline in a graphics rendering system, said apparatus comprising:

first array generating means for forming a first array for referencing active graphical objects associated with said run of pixels;

second array generating means for forming a second array for indicating empty memory locations in said first array;

updating means for updating said first array upon activation or deactivation of a graphical object by said scanline using said second array, wherein when a graphical object is deactivated by said scanline the memory location of the deactivated graphical object in said first array is added to said second array and the deactivated graphical object is flagged in said first array, the flag indicating that the deactivated object does not contribute to said run of pixels; and traversing means for traversing said first array to determine a top-most opaque object without an associated flag, the top-most opaque being considered to contribute to said run of pixels.

15. An apparatus according to claim 14, wherein when a graphical object is activated by said scanline a value representing said activated graphical object is added to said first array at a memory location indicated by said second array.

16. An apparatus according to claim 15, wherein if the value representing the activated graphical object is greater than a second value representing a current top-most active object, then the second value representing the current top-most active object is set to the value.

17. An apparatus according to claim 16, wherein if the current top-most active object is still active and is opaque then the current top-most active object is considered to contribute to said run of pixels, otherwise said first array is sorted such that one or more top-most locations of said first array represent active objects contributing to said run of pixels.

18. An apparatus according to claim 17, wherein graphical objects corresponding to said run of pixels are represented as a linked list of graphical objects.

19. An apparatus according to any one of claims 14, 15, and 16–18, wherein said first and second arrays are integer arrays.

20. An apparatus for determining graphical objects contributing to a run of pixels for a scanline in a graphics rendering system, said apparatus comprising:

first array forming means for forming a first array for referencing active graphical objects associated with said run of pixels;

second array forming means for forming a second array for indicating empty memory locations in said first array, wherein when a graphical object is activated by said scanline a value representing said activated graphical object is added to said first array at a memory location indicated by said second array, and wherein when a graphical object is deactivated by said scanline the memory location of the deactivated graphical object in said first array is added to said second array and the deactivated graphical object in said first array is flagged, the flag indicating that the deactivated object does not contribute to said run of pixels; and traversing means for traversing said first array to determine a top-most opaque object without an associated flag, the top-most opaque object being considered to contribute to said run of pixels.

21. A program including computer implemented program code for determining graphical objects contributing to a run of pixels for a scanline in a graphics rendering system, said program comprising:

code for forming a first array for referencing active graphical objects associated with said run of pixels;

code for forming a second array for indicating empty memory locations in said first array;

code for updating said first array upon activation or deactivation of a graphical object by said scanline using said second array, wherein when a graphical object is deactivated by said scanline the memory location of the deactivated graphical object in said first array is added to said second array and the deactivated graphical object is flagged in said first array, the flag indicating that the deactivated object does not contribute to said run of pixels; and code for traversing said first array to determine a top-most opaque object without an associated flag, the top-most opaque object being considered to contribute to said run of pixels.

22. A program including computer implemented program code for determining graphical objects contributing to a run of pixels for a scanline in a graphics rendering system, said program comprising:

code for forming a first array for referencing graphical objects associated with said run of pixels;

code for forming a second array for indicating empty memory locations in said first array, wherein when a graphical object is activated by said scanline a value representing the activated graphical object is added to said first array at a memory location indicated by said second array, and wherein when a graphical object is deactivated by said scanline the memory location of the deactivated graphical object in said first array is added to said second array and the deactivated graphical object in said first array is flagged, the flag indicating that the deactivated object does not contribute to said run of pixels; and code for traversing said first array to determine a top-most opaque object without an associated flag, the top-most opaque object being considered to contribute to said run of pixels.

* * * * *